US 8,227,631 B2

(12) United States Patent
Kruidenberg

(10) Patent No.: US 8,227,631 B2
(45) Date of Patent: Jul. 24, 2012

(54) METHOD AND APPARATUS FOR PROCESSING VEGETABLE OILS

(75) Inventor: Marco Kruidenberg, Oostvoorne (NL)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 12/556,463

(22) Filed: Sep. 9, 2009

(65) Prior Publication Data

US 2010/0200805 A1 Aug. 12, 2010

Related U.S. Application Data

(60) Continuation of application No. 11/603,514, filed on Nov. 22, 2006, now Pat. No. 7,598,407, which is a division of application No. 10/484,797, filed as application No. PCT/US01/51220 on Nov. 13, 2001, now Pat. No. 7,597,783.

(60) Provisional application No. 60/307,577, filed on Jul. 23, 2001.

(51) Int. Cl.
*C11B 1/00* (2006.01)

(52) U.S. Cl. ......................................................... 554/22

(58) Field of Classification Search ..................... 554/22
See application file for complete search history.

(56) References Cited

U.S. PATENT DOCUMENTS

| 3,239,547 | A | | 3/1966 | Brion et al. | |
|---|---|---|---|---|---|
| 5,374,751 | A | * | 12/1994 | Cheng et al. | 554/205 |
| 5,932,261 | A | * | 8/1999 | Unnithan | 426/417 |

FOREIGN PATENT DOCUMENTS

| GB | 701631 A | | 12/1953 |
|---|---|---|---|
| GB | 701631 A | * | 12/1953 |

OTHER PUBLICATIONS

European Patent Office, Office Action for EP01273416.6 dated Dec. 30, 2010.

* cited by examiner

*Primary Examiner* — Deborah D Carr

(57) ABSTRACT

The present invention provides certain improvements in methods for processing vegetable oils and apparatus for carrying out such methods. One embodiment provides a method for processing a partially processed oil including glycerides and a volatilizable impurity fraction. The partially processed oil may processed by driving off a first volatiles stream comprising a portion of the glycerides and at least a portion of the volatilizable impurity fraction, leaving a deodorized oil. The first volatiles stream may be introduced into a first condensing chamber and a glyceride-rich, impurity-poor first condensate may be condensed from the first volatiles stream, leaving a glyceride-poor, impurity-rich second volatiles stream. The second volatiles stream may be passed into a second condensing chamber and a glyceride-poor, impurity-rich second condensate may be condensed from the second volatiles stream.

29 Claims, 3 Drawing Sheets

METHOD AND APPARATUS FOR PROCESSING VEGETABLE OILS

CROSS REFERENCE TO RELATED APPLICATIONS

The present application is a continuation of U.S. patent application Ser. No. 11/603,514, filed Nov. 22, 2006, now U.S. Pat. No. 7,598,407 which is a divisional of U.S. patent application Ser. No. 10/484,797, filed Jun. 2, 2004, now U.S. Pat. No. 7,597,783 which is a U.S. National Phase application of International Application No. PCT/US2001/051220, filed Nov. 13, 2001, which claims priority to U.S. Provisional Application No. 60/307,577, filed Jul. 23, 2001, the disclosures of which are incorporated herein by reference in their entirety.

TECHNICAL FIELD

The present invention relates to methods and apparatus for processing vegetable oils and animal fats such as lard, tallow, and fish oil. The invention may be used to increase yield in oil processing by recovering desirable components from a volatile stream exiting an oil deodorizer.

BACKGROUND

The primary components of most vegetable oils are triglycerides. Depending on the oil source, these triglycerides may include a variety of saturated, partially saturated, and unsaturated fatty acids (e.g., oleic, linoleic, linolenic, lauric, palmitic, and myristic acids) esterified on a glycerol molecule in various combinations. Raw, unprocessed vegetable oils often contain varying amounts of other compounds, too. Some of these compounds are desirable components of the oil, i.e., they need not be removed during processing to yield a commercially salable oil. Such desirable components commonly include diglycerides, tocopherols, sterols, and sterol esters, and some oils will include other desirable components (e.g., tocotrienols in palm oil). Other compounds in the raw vegetable oil are undesirable impurities which can adversely affect the taste, smell, appearance, or storage stability of a refined oil and hence are beneficially removed. These undesirable impurities generally include phosphatides, free fatty acids, odiferous volatiles, colorants, waxes, and various metal compounds. Some of these undesirable impurities (e.g., metal compounds) are contaminants which have little or no commercial value. Free fatty acids and some other components of raw oils are undesirable in a processed oil and may be considered "undesirable impurities" in that context, but may still have meaningful commercial value.

Vegetable oil impurities are typically removed in three separate steps, particularly degumming and/or alkali refining, bleaching, and physical refining and/or deodorizing. For certain oils, it may be desirable to "degum" the raw oil prior to alkali refining. Degumming and alkali refining generally remove phosphatides, soaps, and other impurities such as metals. Bleaching may improve the color and flavor of refined oil by decomposing peroxides and removing oxidation products, trace phosphatides, and trace soaps. In the final physical refining and/or deodorizing step, remaining volatilizable impurities are removed to yield a deodorized vegetable oil having the desired final characteristics. The volatilizable impurities removed in the deodorization process commonly include free fatty acids, aldehydes, ketones, alcohols, and other hydrocarbon impurities. Some of these impurities may come directly from the oil seeds themselves while others may arise from pesticides, fungicides, and other compounds applied to the seeds or to the plants from which the seeds are derived.

Most physical refining and deodorization processes rely on volatility differences to drive off the relatively more volatile impurities from the relatively less volatile desirable components of the vegetable oil. Unfortunately, some of the desirable components of the vegetable oil may be driven off with the volatilizable impurities during the deodorization process. As a consequence, the volatiles stream exiting the deodorizer will include a substantial fraction, if not substantially all, of the impurities, but may also include a varying amount of desirable compounds such as triglycerides, diglycerides, tocopherols, sterols, sterol esters, and tocotrienols. Since these desirable compounds could remain in the final deodorized vegetable oil without objection, the volume of such desirable compounds in the vapor stream exiting the deodorizer represents loss of a commercially valuable product.

Most conventional deodorizing processes are carried out using vacuum-steam deodorization, in which a heated vegetable oil is contacted with steam at a low operating pressure. The volatilizable impurities and some of the desirable vegetable oil components are carried off with the steam. This steam-laden vapor stream is subsequently condensed into an impurity-laden liquid, with some or all of the steam being vented to the atmosphere through the vacuum system. Other deodorizing processes may employ heated nitrogen or other gases instead of steam, but such processes are less widely used in vegetable oil processing.

Because of the relatively high concentration of impurities, the condensate from the deodorizer vapor stream has limited commercial value. While it is theoretically possible to reintroduce this condensate into the raw oil feed, this is often ill-advised because it can unacceptably degrade the quality of the starting oil and overburden the capacity of the deodorizer. It may be possible to resell the condensate for further processing to use as an animal feed additive or the like, but the value of such a condensate is significantly less than the value of the deodorized vegetable oil.

SUMMARY OF THE INVENTION

The present invention provides certain improvements in methods for processing vegetable oils and apparatus for carrying out such methods. In accordance with one embodiment, the invention provides a method for processing a partially processed oil which includes glycerides and a volatilizable impurity fraction. In accordance with this method, the partially processed oil is deodorized by driving off a first volatiles stream comprising a portion of the glycerides and at least a portion of the volatilizable impurity fraction, leaving a deodorized oil. The first volatiles stream may be introduced into a first condensing chamber and a glyceride-rich, impurity-poor first condensate may be condensed from the first volatiles stream, leaving a glyceride-poor, impurity-rich second volatiles stream. The second volatiles stream may be passed into a second condensing chamber and a glyceride-poor, impurity-rich second condensate may be condensed from the second volatiles stream. If the partially processed oil of this embodiment includes tocopherols and/or tocotrienols, the first volatiles stream may include a portion of the tocopherols and/or tocotrienols and a majority of the tocopherols and/or tocotrienols in the first volatiles stream may be condensed in the first condensate.

A method of processing vegetable oil in accordance with another embodiment of the invention comprises refining the vegetable oil to yield a refined vegetable oil. The refined vegetable oil is bleached to yield a bleached vegetable oil comprising glycerides and a volatilizable impurity fraction. The bleached vegetable oil is deodorized to yield a deodorized vegetable oil and a first volatiles stream. The first volatiles stream comprises a portion of the glycerides and a majority of the volatilizable impurity fraction of the bleached vegetable oil. The first volatiles stream is partially condensed to yield a glyceride-rich first condensate and a glyceride-poor second volatiles stream. The second volatiles stream may comprise a majority of the volatilizable impurity fraction. In one particular embodiment, the first volatiles stream is partially condensed by cooling the first volatiles stream. This cooling may be accomplished by spraying a portion of the glyceride-rich first condensate back into the volatiles stream.

Another embodiment of the invention provides a method for processing a vapor stream from a vegetable oil deodorizer, the vapor stream comprising desirable glycerides and undesirable impurities. The vapor stream is partially cooled to preferentially condense a glyceride-rich recovered oil, yielding an impurity-rich byproduct vapor. In one embodiment of this method, the vapor stream is cooled by spraying the recovered oil in the vapor stream or otherwise contacting the vapor stream with the recovered oil.

In yet another embodiment, the invention provides a method for processing a vegetable oil comprising desirable compounds and volatilizable impurities. In accordance with this method, the vegetable oil is introduced into a deodorizer maintained at a pressure of no greater than 10 mm Hg. The vegetable oil is contacted with steam in the deodorizer to volatilize a substantial fraction of the impurities and a minor fraction of the desirable compounds into a volatiles stream, leaving a deodorized vegetable oil. The volatiles stream is passed into a recovery condenser maintained at a pressure of no greater than 10 mm Hg. The volatiles stream is partially cooled to selectively condense a substantial fraction of the desirable compounds into a recovered fluid, leaving a byproduct stream comprising a substantial fraction of the impurities in the volatiles stream. A portion of the recovered fluid may be sprayed back into the volatiles stream to cool the volatiles stream. The byproduct stream may be passed into a byproduct condenser maintained at a pressure of less than 10 mm Hg and the byproduct stream may be further cooled to condense a majority of the remaining impurities into a byproduct fluid.

An alternative embodiment of the invention provides a vegetable oil processing system which includes a deodorizer maintained at an elevated temperature and a pressure of no greater than 10 mm Hg. The deodorizer may include a first vapor outlet through which volatilized impurities and a desirable glyceride fraction may exit. A recovery condenser has a first vapor inlet in fluid communication with the first vapor outlet; a condensing chamber maintained at a pressure no greater than 10 mm Hg; a second vapor outlet through which a glyceride-poor byproduct vapor stream may exit the condensing chamber; and a recovered fluid outlet through which a glyceride-rich recovered fluid may exit the condensing chamber. A recovered fluid spray system is in fluid communication with the recovered fluid outlet. The recovered fluid spray system may include a recovery spray head in fluid communication with the condensing chamber and a recirculation pump adapted to deliver a cooling flow of the recovered fluid to the recovery spray head. A byproduct condenser has a second vapor inlet and a byproduct condensing chamber maintained at a pressure no greater than 10 mm Hg. The second vapor inlet is in fluid communication with the second vapor outlet and receives the byproduct vapor stream. The byproduct condensing chamber may be adapted to condense a substantial fraction of the impurities in the byproduct vapor stream.

DETAILED DESCRIPTION

Figure 1:
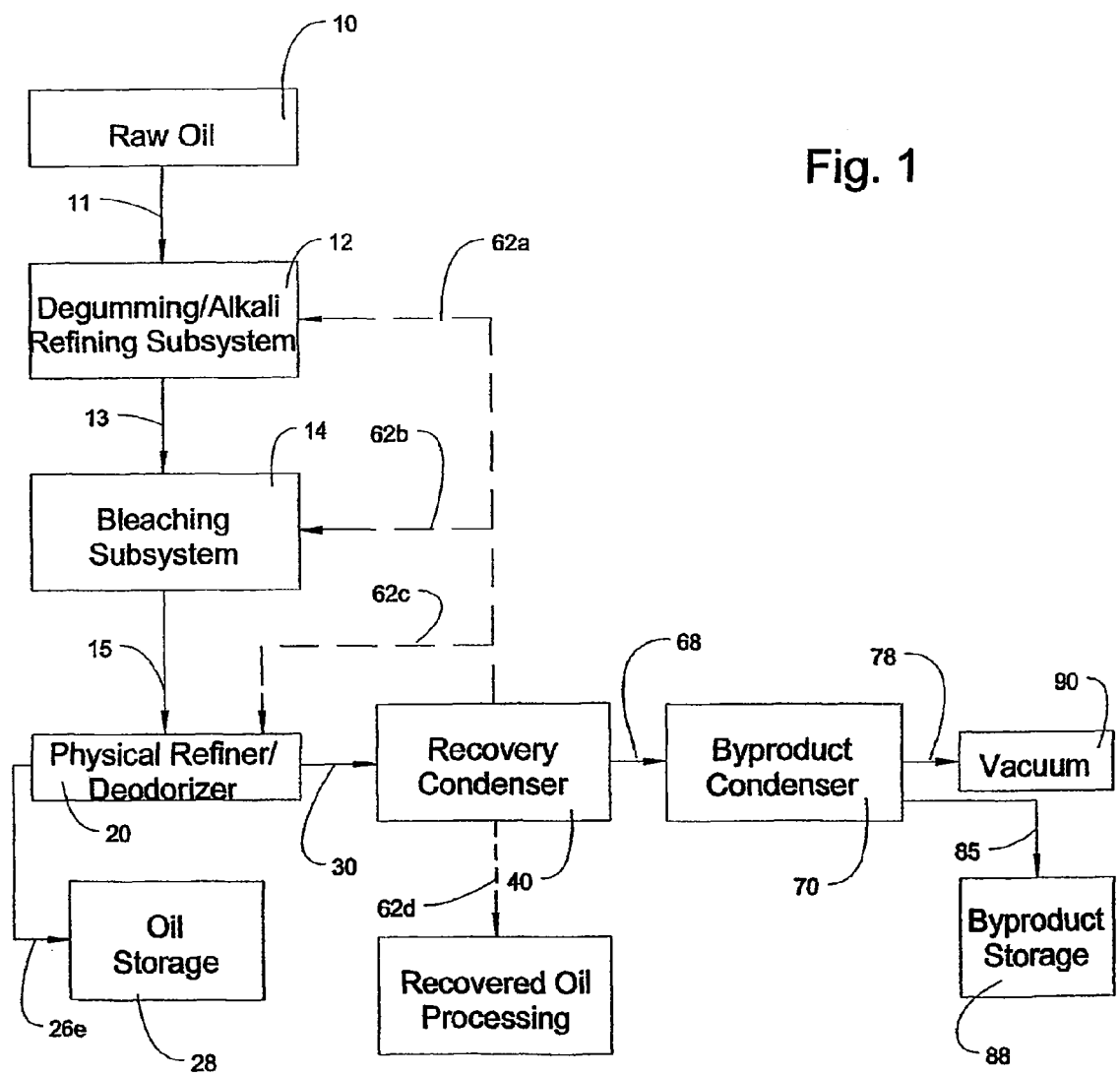
FIG. 1 is a flow diagram schematically illustrating aspects of a vegetable oil processing system in accordance with one embodiment of the invention.

Various embodiments of the present invention provide methods and apparatus for processing oils, e.g., vegetable oils. The following description provides specific details of certain embodiments of the invention illustrated in the drawings to provide a thorough understanding of those embodiments. It should be recognized, however, that the present invention can be reflected in additional embodiments and the invention may be practiced without some of the details in the following description.

FIG. 1 provides a schematic overview of a vegetable oil processing system in accordance with one embodiment of the invention. In this system, a raw oil may be delivered from a raw oil supply 10 to an optional degumming subsystem 12 via a raw oil feed line 11. A wide variety of raw oils may be used, including those derived from soybean oil, corn oil, cottonseed oil, palm oil, peanut oil, rapeseed oil, safflower oil, sunflower seed oil, sesame seed oil, rice bran oil, coconut oil, canola oil, and mixtures thereof. While the present invention may be used beneficially with virtually any vegetable oil, it has particular utility in processing vegetable oils with relatively high losses in the deodorization and/or physical refining process (e.g., palm oil and coconut oil), and oils with more valuable substances such as tocopherols, tocotrienols, or sterols. Embodiments of the invention may also be used in processing animal fats such as lard, tallow, and fish oil.

The raw oil may be degummed, if necessary, in the degumming/alkali refining subsystem 12. Degumming generally refers to the process of removing phosphatides from crude vegetable oils. Any of a variety of degumming processes known in the art may be used. One such process (known as "water degumming") includes mixing water with the vegetable oil and separating the resulting mixture into an oil component and an oil-insoluble hydrated phosphatides component, sometimes referred to as "wet gum" or "wet lecithin." Such processes are generally known in the art and are also outlined in U.S. Pat. No. 6,172,248, the entirety of which is incorporated herein by reference. Such a process is commonly followed by alkali refining, as explained below. In an alternative embodiment more useful in connection with physical (as opposed to alkali) refining, phosphatide content is further reduced by other degumming processes, such as enzymatic degumming (e.g., ENZYMAX from Lurgi), chemical degumming (e.g., SUPER/UNI degumming from Unilever, TOP degumming from VandeMoorrtele/Dijkstra CS, or SOFT degumming from Tirtiaux).

If so desired, raw or degummed oil may be refined via alkali refining in the degumming/alkali refining subsystem 12 prior to bleaching the oil. Generally, vegetable oil refining involves removing free fatty acids and phosphatides from the vegetable oil. Most refining operations employ either alkali refining or physical refining, also referred to as steam refining. In alkali refining, the most common of the two refining methods, the vegetable oil is commonly mixed with a hot, aqueous alkali solution, producing a mixture of refined oil, also known as "neutral oil," and soapstock. The soapstock is then separated from the refined oil.

The refined oil from the degumming/alkali refining subsystem 12 may be delivered to the bleaching subsystem 14 via a refined oil feed line 13. Alternatively, raw oil may be delivered directly from the raw oil supply 10 to the bleaching system without any pre-treatment in the degumming/alkali refining subsystem 12. The nature and operation of the bleaching subsystem 14 will depend, at least in part, on the nature and quality of the oil being bleached. Generally, the raw or refined oil will be mixed with a bleaching agent which may combine with oxidation products, trace phosphatides, trace soaps, and other compounds adversely affecting the color and flavor of the oil. As is known in the art, the nature of the bleaching agent can be selected to match the nature of the refined oil to yield a desirable bleached oil. Bleaching agents generally include natural or "activated" bleaching clays, also referred to as "bleaching earth," activated carbon, and various silicates. Suitable bleaching earths are commercially available and U.S. Pat. No. 6,027,755, the entirety of which is incorporated herein by reference, discloses properties of one useful bleaching earth product.

Figure 2:
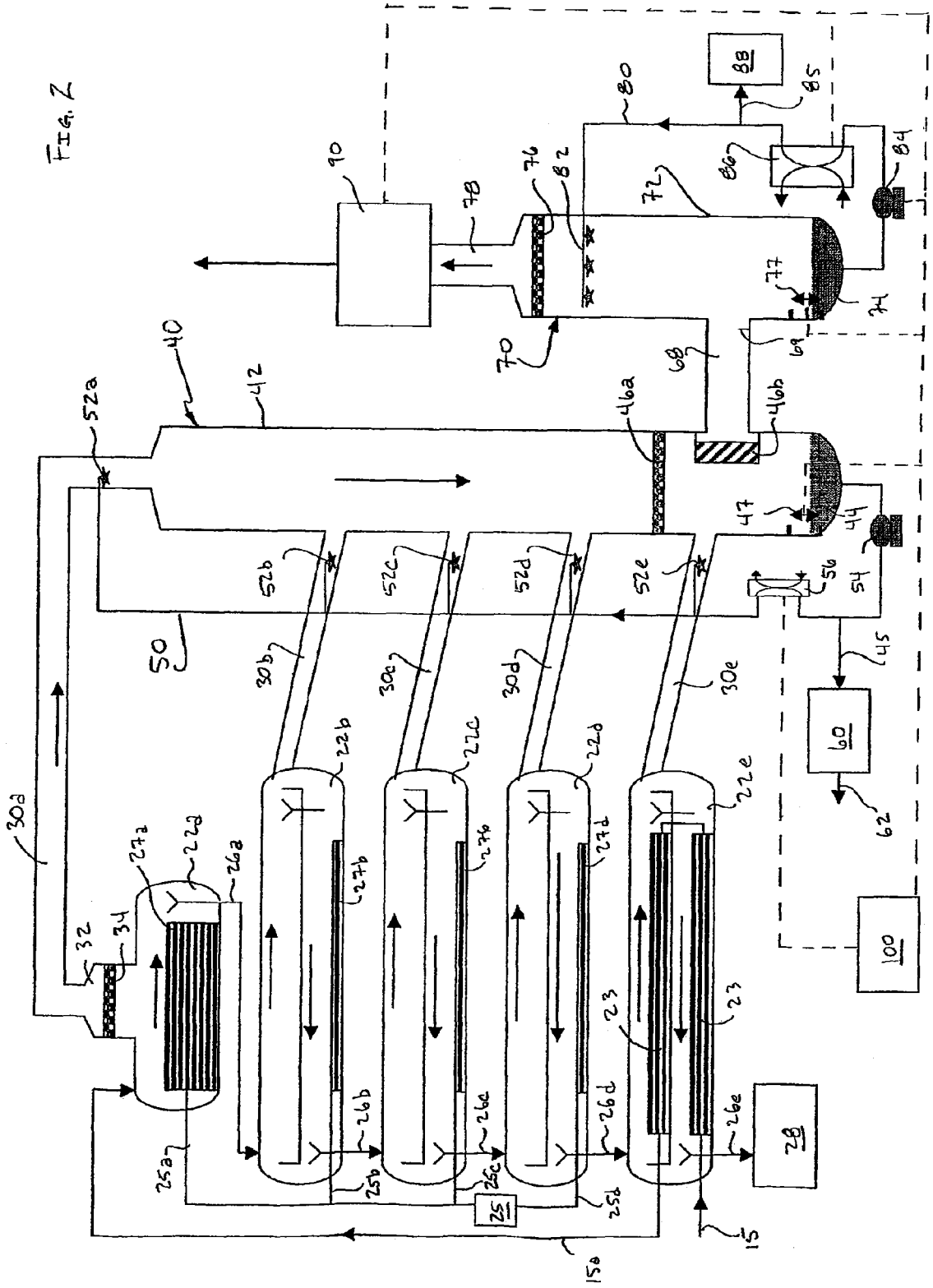
FIG. 2 is a more detailed schematic view of portions of the oil processing system shown in FIG. 1 in accordance with a further embodiment of the invention.

The resultant bleached oil is delivered from the bleaching subsystem 14 to the physical refiner/deodorizer 20 through a bleached oil feed line 15. If the oil has been alkali refined, the refined, bleached oil may be deodorized in the physical refiner/deodorizer 20. Physical refining is a steam distillation process similar to that used in conventional vegetable oil deodorizing. Such deodorizing processes are explained in more detail below in connection with the deodorizer 20, but it should be understood that this same process and equipment may be used to physically refine the oil. Such a physical refining or deodorizing process may include contacting the vegetable oil with steam to vaporize and carry away free fatty acids and other impurities. For example, the vapor stream exiting a physical refining unit of the refining subsystem 12 may be passed to a recovery condenser 40 and byproduct condenser 70 as discussed below in connection with the deodorizer 20. FIG. 1 shows the deodorizer 20, recovery condenser 40, byproduct condenser 70 and other elements of the processing system in a simple flow diagram. All of these remaining elements are shown in FIG. 2 and the operation of these elements is discussed in greater detail in connection with FIG. 2. Generally, though, the deodorizer will treat the bleached oil to drive off volatilizable impurities in the oil, yielding a deodorized oil. The deodorized oil may be delivered from the deodorizer to an oil storage facility 28 or a further processing facility (not shown) via an outlet line 26e.

The impurities and other compounds are passed from the deodorizer 20 to the recovery condenser 40 in a volatiles stream via a vapor conduit 30. The recovery condenser may preferentially condense a glyceride-rich recovered fluid, which may comprise an oil, and pass an impurity-rich byproduct vapor to a byproduct condenser 70 via a byproduct vapor conduit 68. The recovered oil may be delivered to a recovered oil storage container (not shown in FIG. 1) or, desirably, returned to a previous stage of the oil processing system. For example, the recovered oil may be delivered to the degumming/alkali refining subsystem 12 via a first delivery line 62a, to the bleaching subsystem 14 via a second delivery line 62b, or back into the deodorizer 20 via a third delivery line 62c. In one embodiment of the invention, the recovered oil has an impurity content sufficiently low to justify delivering it to the bleaching system 14 via a second delivery line 62b rather than going all the way back to the refining subsystem 12 for further refining. Alternatively, the recovered oil may be delivered to a recovered oil processing facility 62e via a fourth delivery line 62d.

The impurity-rich byproduct vapor stream delivered through the byproduct vapor conduit 68 is condensed in the byproduct condenser 70. This yields a byproduct condensate which may be delivered to a byproduct condensate container 88 via a byproduct condensate output line 85. A remainder of the byproduct vapor stream, typically consisting primarily of steam, will pass from the byproduct condenser 70 to the vacuum system 90 via an exit conduit 78.

FIG. 2 shows certain components of the system broadly outlined in FIG. 1 in more detail. FIG. 2 does not specifically illustrate the bleaching subsystem 14 or any of the other elements upstream of the bleaching subsystem 14, however.

As shown in the upper left corner of FIG. 2, bleached oil is delivered from the bleaching subsystem 14 (not shown) to the deodorizer 20 via the bleached oil feed line 15. The deodorizer 20 may be any of a wide variety of commercially available vegetable oil deodorizing systems, such as those sold by Krupp of Hamburg, Germany; De Smet Group, S.A. of Brussels, Belgium; Gianazza Technology s.r.l. of Legnano, Italy; S.A. Fractionnement Tirtiaux of Fleurus, Belgium; Alfa Laval AB of Lund, Sweden, or others. In the system shown in FIG. 2, the deodorizer 20 includes a series of separate deodorizing chambers 22a-e arranged in series to treat the bleached oil. Progressively deodorized oil will pass from one of the deodorizing chambers 22 to the next until the oil is suitably deodorized. Hence, bleached oil will pass through the first deodorizer chamber 22a, then to the second deodorizer chamber 22b via a first chamber outlet 26a. Oil deodorized in the second deodorizer chamber 22b will be delivered to the third deodorizer chamber 22c via a second chamber outlet 26b. The further deodorized vegetable oil will then pass through the third chamber outlet 26c to the fourth deodorizer chamber 22d and from the fourth chamber 22d to the fifth chamber 22e via a fourth chamber outlet 26d. Vegetable oil in the fifth deodorizer chamber 22e may be delivered via a fifth chamber outlet 26e to a deodorized oil storage container 28.

Figure 3:
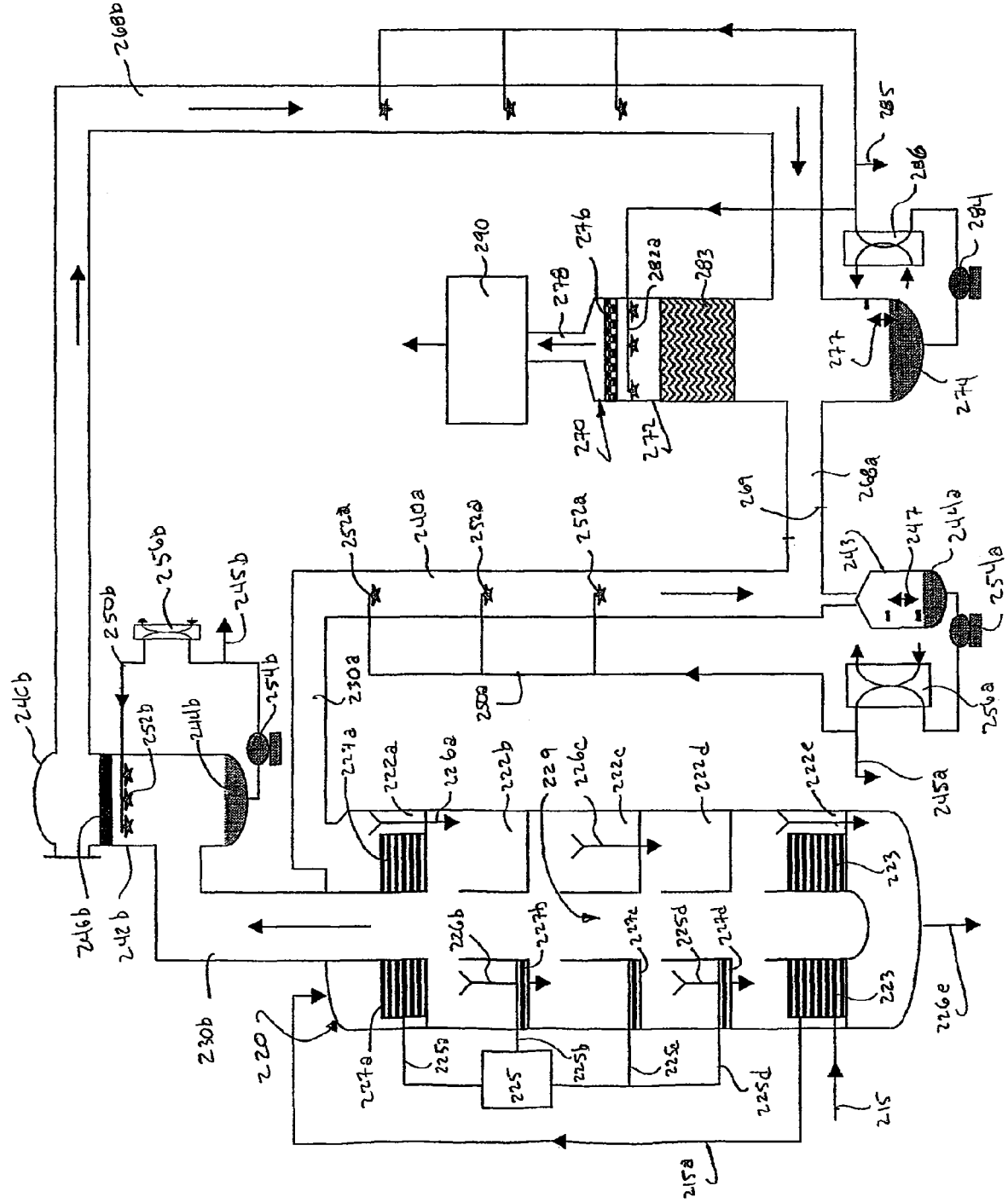
FIG. 3 is a more detailed schematic view of portions of the oil processing system shown in FIG. 1 in accordance with an alternative embodiment of the invention.

While the deodorizer illustrated in FIG. 2 has five separate deodorizer chambers 22a-e, it should be understood that any suitable number of deodorizer chambers may be employed. In certain embodiments, a single deodorizer chamber 22 may be employed. This single deodorizer chamber 22 may have any number of separate trays. Such a structure is shown in FIG. 3 and discussed in more detail below. If so desired, the last deodorizer chamber 22e may function as a heat exchanger. Bleached oil from the bleaching subsystem 14 may be delivered to the heat exchange chamber 22e via the bleached oil feed line and preheated in heat exchange tubes 23. Thereafter, the pre-heated bleached oil can be delivered to the first deodorizing chamber 22a via the bleached oil feed line 15a.

The deodorizer chambers 22 are desirably maintained at an elevated temperature and a reduced pressure to better volatilize the volatilizable impurities in the vegetable oil. The precise temperature and pressure may vary depending on the nature and quality of the vegetable oil being processed and the temperature may even vary from one of the deodorizer chambers 22 to the next. In one embodiment of the invention, each of the deodorizer chambers is maintained at a pressure of no greater than 10 mm Hg. In one particular embodiment, each of the deodorizer chambers 22 is maintained at a pressure of no greater than 5 mm Hg, e.g., 1-4 mm Hg. The low pressure in the deodorizer chambers 22 may be provided by a vacuum system 90. The vacuum system 90 shown in FIG. 2 is not in direct communication with the deodorizer chambers 22. Instead, the vacuum system 90 acts on the deodorizing chambers 22 via vapor conduits 30a-e, recovery condenser 40, byproduct vapor conduit 68, and byproduct condenser 70. A large variety of suitable vacuum systems are commercially available for use in vegetable oil processing. Most commonly, multi-stage steam jet ejectors will be employed, with a three-stage steam jet ejection system being deemed suitable. If so desired, an ice condensing system can be included at the inlet end of the vacuum system 90 to remove water from the vapor before it is delivered to such a steam jet ejection system.

The temperature in the deodorizing chambers may be varied as desired to optimize the yield and quality of the deodorized oil. At higher temperatures, reactions which may degrade the quality of the oil will proceed more quickly. For example, at higher temperatures, cis fatty acids may be converted into trans form. Operating the deodorizer at lower temperatures may minimize the cis-to-trans conversion, but will generally take longer to remove the requisite percentage of the volatilizable impurities in the oil. For most vegetable oils, maintaining the oil at a temperature of 200° C. or higher should suffice. In many circumstances, an oil temperature of about 230-285° C. is suitable, with temperatures of about 240-270° C. being useful for many oils. In one exemplary embodiment useful in physically refining palm oil, the first deodorizing chamber 22a is maintained at a pressure of 2-3 mm Hg and the vegetable oil is heated to a temperature of about 260-270° C. Temperatures of about 240-250° C. and pressures of about 1-4 mm Hg are appropriate for deodorizing hydrogenated oils and alkali-refined soybean oil, rape oil, and sunflower oil. For physical refining of coconut oil or palm kernel oil, temperatures of about 240-245° C. and pressures of about 1-4 mm Hg are suitable. Coconut oil which has been alkali refined may be deodorized at a lower temperature of about 200-220° C. at a pressure of about 2-3 mm Hg.

The temperature of the vegetable oil in the deodorizing chambers 22 may be elevated and controlled in any suitable fashion. In one embodiment, the oil may be heated, at least in part, by a supply of heated steam. In such an embodiment, a steam generator 25 may deliver a recirculating flow of steam through the deodorizer chambers 22a-e via a series of steam delivery lines 25a-e, respectively. The steam delivery lines 25a-e are closed lines, merely passing heated steam through the chambers 22a-e through closed conduits 27a-e, respectively.

A quantity of steam, typically from a steam source (not shown) separate from the steam supply 25, may be delivered through low-pressure (e.g., 1-5 Bar) steam lines to sparge pipes (not shown) which sparge steam through the liquid vegetable oil in the deodorizer chambers 22. As the steam, which may be superheated, bubbles through the vegetable oil, it will help strip the volatilizable impurities from the vegetable oil. This produces a steam-containing vapor stream which is delivered from the deodorizer to the recovery condenser 40. The vapors from the heated vegetable oil exiting all of the deodorizer chambers 22a-e may be delivered to the recovery condenser 40 through a common vapor conduit 30. In the illustrated embodiment, each of the deodorizer chambers 22a-e is provided with a separate vapor conduit 30a-e, respectively, to deliver vapors directly to the recovery condenser 40. The flow rate of steam through the vegetable oil will vary depending on the nature and quality of the oil being deodorized or physically refined and the pressure and temperatures in the deodorizer chambers 22a-e. Generally, though, steam flow rates on the order of 0.7-2.5 weight percent (wt. %) of the oil flow rates should suffice for most common processing conditions.

As the steam from the steam supply 25 bubbles through the vegetable oil, it may liberate liquid droplets of vegetable oil. These liquid droplets can be entrained in the flow of vapor from the deodorizer chambers 22 to the recovery condenser 40. As will be explained below, the recovery condenser 40 is adapted to help remove these droplets from the vapor stream. Nonetheless, in certain embodiments, the invention employs a deodorizer demister 34 to help remove at least a portion of the entrained droplets from the vapor stream exiting the deodorizer 20. In the illustrated embodiment, a single deodorizer demister 34 is positioned in a dome 32 above the first deodorizer chamber 22a, but none of the other deodorizer chambers 22b-e are provided with demisters. It should be understood, though, that any desired number of demisters may be employed and one demister or multiple demisters may be utilized in connection with each vapor conduit 30 if deemed necessary.

Any known demister construction may be employed. For example, the deodorizer demister 34 may include one or more knitted wire mesh pads which span substantially the entire cross-sectional area of the dome 32. Such wire mesh demisters are commercially available. In one embodiment, the deodorizer demister 34 is selected to reduce droplet entrainment without unduly impacting gas flow therethrough. This helps minimize the pressure drop across the demister 34 and enhance efficiency of the deodorizer 20 without increasing demands on the vacuum system 90.

As explained above, the vapor stream exiting the deodorizer 20 ideally contains all of the volatilizable impurities in the oil while leaving all of the desirable glycerides and other components in the deodorizer 20. In practice, not all of the impurities in the vegetable oil will be removed and some portion of the desirable components of the vegetable oil will be carried off in the vapor stream. The deodorizer desirably removes at least a majority (i.e., greater than 50%) of the volatilizable impurities in the vegetable oil and, more desirably, removes a substantial fraction of the volatilizable components, leaving none or only a relatively minor fraction of the volatilizable impurities in the deodorized vegetable oil. In the embodiment of FIG. 2, a majority of the volatilizable impurities which are removed from the vegetable oil will be removed in the first deodorizing chamber 22a, with decreasing volumes of impurities being removed in subsequent deodorizing chambers 22b-e. This can be altered by changing the temperature, residence time, or steam flow rates through each of the deodorizer chambers 22 individually.

The vapor stream from the deodorizer 20 may be cooled in the recovery condenser 40. In the illustrated embodiment, the recovery condenser 40 comprises a condensing chamber 42 which is adapted to collect a pool of recovered oil 44 adjacent the bottom thereof. Vapor from the vapor conduits 30 is delivered at various heights above the pool 44 and flows downwardly toward the pool 44. The vapor then exits the condensing chamber 42 through a byproduct vapor conduit 68 positioned toward the lower end of the condensing chamber 42 but above the pool 44. In an alternative embodiment, the vapors are directed upwardly from the vapor conduits 30 and exit the recovery condenser 40 toward the upper end of the recovery condenser 40. It is anticipated that such an upward vapor flow may facilitate recovery of the recovered oil.

The vapor conduits 30a-e may discharge into the condensing chamber 42 in any desired direction. In the schematic view of FIG. 2, the first vapor conduit 30a is shown as delivering vapor directly downwardly generally along a central axis of the condensing chamber 42 while the remaining vapor conduits 30*b-e* deliver vapor at an angle downwardly transverse to that axis. In an alternative embodiment, the flow of vapor from the vapor conduit is redirected to increase contact with the walls of the condensing chamber 42, such as by introducing the vapor from the vapor conduits 30 generally tangentially.

The vapor stream entering the recovery condenser 40 is only partially cooled to preferentially condense the less volatile desired components in the vapor stream, leaving most of the more volatile volatilizable impurities largely in vapor form. The temperature and quench rate of the vapor in the recovery condenser can be controlled as desired to increase recovery of the desired components while minimizing the percentage of the impurities in the pool of recovered oil 44. In one embodiment suitable for physically refining palm oil, for example, the temperature of the vapor stream in the recovery condenser is reduced to a temperature of no greater than 230° C. In one such embodiment, the temperature varies along the height of the recovery condenser 40, but remains in a range of about 180-230° C. throughout the passage through the recovery condenser 40.

If so desired, one or more demisters may be employed in the recovery condenser to help remove liquid droplets from the vapor stream. In the recovery condenser 40 of FIG. 2, a first demister 46*a* is positioned above the byproduct vapor conduit 68 and may span substantially the entire cross section of the recovery condenser 40. A wire mesh demister such as that noted above in connection with the deodorizer demister 34 may be employed as the first demister 46*a* of the recovery condenser. A second demister 46*b* may be disposed adjacent the inlet end of the byproduct vapor conduit 68. This can help minimize the entrainment of droplets in the byproduct vapor as it exits the recovery condenser 40. One suitable type of demister 46*b* for this application is a so-called chevron demister, which comprises a plurality of chevron- or V-shaped metal plates which define a tortuous passageway for passage of vapors into the byproduct vapor conduit 68.

Recovered oil may be removed from the pool 44 at the bottom of the recovery condenser 40 and delivered to a recovered oil storage 60 via a recovered oil output line 45. If so desired, the recovered oil may be delivered from the recovered oil storage container 60 or directly from the output line 45 to a recovered oil delivery line 62, such as the lines 62*a-d* shown in FIG. 1. A float 47 or other suitable mechanism may be employed to monitor the level of the recovered oil in the pool 44 for use in controlling the rate at which the recovered oil is removed from the pool.

In the illustrated embodiment, the recovered oil is recirculated from the pool 44 back into the condensing chamber 42 to help cool the vapor stream as it passes through the recovery condenser 40. In particular, recovered oil is recirculated back into the recovery condenser via a recovered oil recirculation line 50. A pump 54 may be used to pump the recovered oil through the recovered oil recirculation line and to one or more spray heads 52. The embodiment of FIG. 2 employs a separate spray head 52*a-e* for each of the vapor conduits 30*a-e*, respectively. The flow rates of the recovered oil through each of the spray heads 52*a-e*, the droplet size of the oil being sprayed, and the angles of the spray heads 52 *a-e* with respect to the direction of vapor flow through the conduits 30*a-e* may be controlled to better control the profile of the temperature within the recovery condenser 40 and to achieve the desired intimacy of contact between the vapor and the oil droplets. The spray heads 52 may be positioned at any location in fluid communication with the interior of the condensing chamber 42. In the illustrated embodiment, the spray heads 52*a-e* are shown as disposed in the vapor conduits 30*a-e*, respectively.

It should be understood, though, that one or more of the spray heads 52 may be positioned beyond the outlet end of the respective vapor conduit 30 and spray the recovered oil directly into the interior of the recovery condenser. While spraying is employed in one embodiment of the invention, it may be possible to contact the vapor with the oil in other fashions, such as by dripping oil from a number of divider channels over a structured packing, as shown in FIG. 3 and discussed below.

To better control the quench rate and profile of temperature in the recovery condenser, the recirculating recovered oil may be cooled before it is delivered through the spray heads 52. In the illustrated embodiment, the recovered oil recirculation line 50 includes a heat exchanger 56 to help cool the recovered oil. If so desired, the heat exchanger 56 may be used to preheat bleached oil being introduced to the deodorizer 20 with the waste heat from the recovered oil.

The recovered oil produced in the recovery condenser 40 includes a substantial fraction, preferably greater than 50% and optimally substantially higher, of the desirable components in the vapor stream from the deodorizer 20. At the same time, the recovered oil desirably has a relatively minor fraction of the impurities removed in the deodorizer 20. As a consequence, the recovery condenser will yield a relatively impurity-poor recovered oil and a relatively impurity-rich byproduct vapor which may, be delivered to the byproduct condenser 70. As noted above, it is expected that the desirable components of the vapor stream exiting the deodorizer will often include some percentage of glycerides, sometimes including both diglycerides and triglycerides. In such a circumstance, the recovered oil may be relatively glyceride-rich while the byproduct vapor may be relatively glyceride-poor.

As the relatively glyceride-poor, impurity-rich byproduct vapor stream passes through the byproduct vapor conduit 68 to the byproduct condenser 70, additional droplets entrained in the byproduct vapor may coalesce in the byproduct vapor conduit 68. If so desired, a weir 69 may be positioned adjacent the outlet end of the byproduct vapor conduit 68 to collect liquid in the byproduct vapor conduit and allow the liquid to flow back into the pool 44 of recovered oil.

To increase efficiency of the vacuum system 90 and minimize discharge of possible environmental impurities, a byproduct condenser 70 may be disposed between the recovery condenser 40 and the vacuum system 90. The byproduct condenser may take any suitable form to remove a desired amount of the impurities from the byproduct vapor stream before passing it on to the vacuum system 90. In one embodiment, the byproduct condenser 70 comprises a conventional scrubber of the type commercially available for vegetable oil deodorizers from S.A. Fractionnement Tirtiaux of Fleurus, Belgium, among others. In the illustrated embodiment, the byproduct condenser 70 includes a byproduct condensing chamber 72 which collects a pool 74 of byproduct condensate in the bottom thereof. This pool 74 may be recirculated via a byproduct condensate circulation line 80. A pump 84 may be used to recirculate the byproduct condensate and a heat exchanger 86 may be disposed in the byproduct condensate circulation line 80 to cool the byproduct condensate before it is introduced to the interior of the chamber 72 via spray head 82. A float 77 may be provided in the byproduct condensing chamber 72 to monitor the level of the pool 74 of byproduct condensate. Excess byproduct condensate can be removed via output line 85 and stored in a byproduct condensate container 88. This condensate may be disposed of or further processed. If so desired, a demister 76, e.g., a wire mesh demister, may be positioned adjacent an inlet of the exit conduit 78 leading to the vacuum system 90. This demister will help remove any liquid droplets in the gas exiting the byproduct condensing chamber.

The byproduct condensate may include any of the desirable components, e.g., glycerides, which are carried over in minor amounts from the recovery condenser 40 to the byproduct condenser 70. The byproduct condensate desirably also includes a substantial fraction, if not substantially all, of the impurities removed from the oil in the deodorizer 20. Water in the byproduct vapor (e.g., from the steam introduced in the deodorizer 20) may pass through the vacuum system 90 and be condensed. If the vacuum system 90 includes an ice condensing system, as noted above, the water vapor can be deposited in the ice condensing system.

In one preferred embodiment, a controller 100 may be provided to control operating parameters of the system shown in FIG. 2. The controller 100 may be operatively connected to any number of components, including the steam supply 25, the pumps 54 and 84, the floats 47 and 87, the heat exchangers 56 and 86, and the vacuum system 90. By monitoring temperatures, pressures and fluid levels, the controller 100 may be used to control operation of the deodorizer 20, recovery condenser 40, byproduct condenser 70, and vacuum system 90 to optimize yield and quality of the deodorized oil and the recovered oil within acceptable commercial operating parameters.

FIG. 3 illustrates an alternative embodiment of the invention. Many of the elements in FIG. 3 perform functions similar to like elements in FIG. 2. For purposes of comparison with FIG. 2, therefore, like reference numbers have been used in FIG. 3 to identify functionally similar elements, but with the reference numbers in FIG. 3 incremented by 200. Hence, the deodorizer in FIG. 2 bears reference number 20 while the deodorizer in FIG. 3 bears reference number 220.

Whereas the deodorizer 20 of FIG. 2 employs a series of physically discreet deodorizing chambers 22a-e, the deodorizer 220 of FIG. 3 employs a single larger deodorizing chamber with a series of stacked deodorizing trays 222a-e. Each of these stacked trays 222a-e may be thought of as defining effectively separate deodorizing chambers. Such multiple-tray deodorizers are well known in the field and are commercially available from a number of suppliers, including Krupp, DeSmet Group, S.A., and Crown Ironworks of the United States. Such a deodorizer 220 is well suited for physical refining operations. For example, the deodorizer 220 may be used in physical refining of coconut oil. In the illustrated embodiment, the second-fifth deodorizing trays 222b-e communicate with a central chimney 229 which directs the vapors from these trays 222b-e into a second vapor conduit 230b. The volume above the oil level in the first deodorizing tray 222a is effectively isolated from the rest of the deodorizing trays 222b-e by a central wall of the chimney 229. A first vapor stream from the first tray 222a may exit the deodorizer through a dedicated first vapor conduit 230a and pass into a first recovery condenser 240a. The first recovery condenser 240a may simply comprise a length of an external conduit through which the first vapor stream passes, as shown. Alternatively, the first recovery condenser may comprise a domed vessel (similar to that shown as the second recovery condenser 240b) or a length of conduit or a dedicated chamber positioned within the confines of the deodorizer's outer shell.

The first vapor stream is cooled in the first recovery condenser 240a from an elevated initial temperature at which it exits the deodorizer 220 to a lower intermediate temperature before it passes into the first byproduct vapor conduit 268a. This will cause a first recovered fluid or "oil" to collect in a pool 244a in a collection container 243. This first recovered oil may have very high (over 80%) free fatty acid content. As such, it may not be considered a conventional "oil" and may be alternatively referred to as a first recovered fluid. The vapor stream may be cooled in any suitable fashion. Like the recovery condenser 40 of FIG. 2, the first vapor stream may be cooled in the first recovery condenser 240a of FIG. 3 by contacting the first vapor stream with the recovered fluid collected in the pool 244a, e.g., by spraying the recovered fluid via one or more spray nozzles 252a, by dripping the fluid over a structured packing (not shown) or the like.

The lower intermediate temperature may be selected to preferentially condense selected components of the first vapor stream, permitting the rest of the first vapor stream to pass into the byproduct condenser 270. The free fatty acids in the bleached vegetable oil are among the first components to be driven off in the deodorizer 220. The vapor stream generated in the first tray 222a is expected to have a relatively high concentration of free fatty acids and a lower concentration of other impurities in the bleached vegetable oil. By appropriately cooling the first vapor stream in the first recovery condenser 240a, the recovered fluid collected in the first pool 244a may have a high percentage of free fatty acids, with free fatty acid percentages in the first recovered oil in pool 244a in excess of 90% being readily obtainable for at least certain oils. While free fatty acids are not as valuable as the final processed, deodorized oil, higher-purity free fatty acid sources are useful as a raw material in a number of industrial processes and can command a higher price than conventional deodorizer distillate.

The balance of the vapor stream exiting the deodorizer 220 from trays 222b-e may pass up the chimney 229, through a second vapor conduit 230b, and into a second recovery condenser 240b. This second recovery condenser 240b may include a domed roof and a demister 246b. A recirculating flow of a second recovered fluid (which may comprise an oil) from second pool 244b may be delivered via a second recirculation line 250b to one or more spray heads 252b located in the interior of the second condensing chamber 242b. This will cool the second vapor stream from an initial elevated temperature to a lower intermediate temperature before passing through a second byproduct vapor conduit 268b downwardly to the byproduct condenser 270.

The initial temperature of the second vapor stream may be substantially the same as the initial temperature of the first vapor stream as both of these vapor streams exit the same deodorizer 220, which may be held at a substantially constant temperature. In some circumstances, the second vapor stream may have a different temperature, such as in physical refining wherein the second vapor stream will commonly have a lower percentage of the free fatty acids and a lower temperature. The intermediate temperature to which the second recovery condenser 240b cools the second vapor stream need not be the same as the intermediate temperature reached at the exit of the first recovery condenser 240a. To the contrary, the two vapor streams have different compositions and will yield different recovered fluids in pools 244a and 244b. Separately controlling the degree of cooling in the two recovery condensers 240a-b enables optimization of each condensation process to enhance yield and/or composition of the recovered fluids.

Hence, two separate vapor streams exit the deodorizer 220 via two separate vapor conduits 230a-b and are selectively cooled in separate recovery condensers 240a-b. The byproduct vapor streams exiting the recovery condensers 240a-b may be treated in separate byproduct condensers. In the illustrated embodiment, however, both of the byproduct vapor conduits 268a-b direct their respective vapor streams into a common byproduct condenser 270. Construction and operation of the byproduct condenser 270 may be substantially the same as that of the byproduct condenser 70 of FIG. 2. In an alternative embodiment, the byproduct condenser 270 may also include a packing material 283 disposed between the byproduct vapor conduits 268 and the spray heads 282*a*. Rather than spraying fluid from spray heads 282*a*, condensed fluid can be passed through outlets at the same location and simply drip down onto the packing material 283. This packing material 283 may further enhance cooling of the byproduct vapor stream and condensation of any impurities contained therein. This common byproduct condenser 270 may communicate with a common vacuum system 290 through an exit conduit 278. This enables the deodorizer 220, the first and second recovery condensers 240*a-b* and the byproduct condenser 270 to be controlled relatively independently to yield the desired compositions of the deodorized oil, the first recovered fluid, and the second recovered fluid while sharing a single vacuum system 290.

Methods of Operation

As noted above, certain embodiments of the invention include methods of processing vegetable oil. In the following discussion of these embodiments, reference is made to the apparatus illustrated in FIGS. 1 and 2. It should be understood that this is solely for purposes of discussion and that any suitable apparatus, including but not limited to that of FIG. 3, could be used instead of the devices shown in FIGS. 1 and 2.

One embodiment of the invention provides a method for processing a raw vegetable oil. The raw oil may be introduced to the refining subsystem 12 to remove at least some of the free fatty acids, phosphatides and other objectionable components in the oil. If so desired, the raw oil may be degummed before being subjected to alkali or physical refining, generally as outlined above. The resultant refined vegetable oil may be passed to the bleaching subsystem 14 via refined oil feed line 13. Refined oil may be bleached in any appropriate fashion. As explained above, this may include contacting the refined oil with bleaching clay, activated carbon, or silicates then filtering these bleaching agents from the oil. The bleached oil may be delivered to a suitable deodorizer 20 via a bleached oil feed line 15. The refining and bleaching processes may be carried out on a continuous basis or as batch processes. If refining and/or bleaching are done in a batch process, a batch of oil may be delivered from the refining subsystem 12 to the bleaching subsystem 14 and thence to the deodorizer 20.

The parameters of operation of the deodorizer 20 will depend on a number of factors, including the nature and quality of the oil being deodorized, the structure and arrangement of the deodorizer 20, and various processing parameters, including residence time in the deodorizer 20 and the steam flow rates. As explained above, higher temperatures facilitate greater throughput through the deodorizer 20, but can adversely affect the quality of the deodorized oil at longer deodorizer residence times and can increase the quantity of desirable components in the vapor stream exiting the deodorizer. For most vegetable oils, a temperature of 200° C. or higher and residence time of 30 minutes or more in the deodorizer 20 is necessary to yield a commercially acceptable deodorized oil. In one embodiment useful for palm oil, for example, an oil temperature of about 230-285° C. and a deodorizer pressure of less than 10 mm Hg is useful, with one exemplary embodiment employing a temperature of about 260-270° C. and a pressure in the deodorizer 20 of about 2-3 mm Hg.

Vapor driven off in the deodorizer may then be delivered via one or more vapor conduits 30 to the recovery condenser 40. The vapor stream exiting the deodorizer 20 desirably includes a substantial fraction of the volitalizable impurities in the vegetable oil delivered to the deodorizer 20 and a relatively small portion of the more desirable components of the vegetable oil. The nature of the desirable components in the vapor stream exiting the deodorizer will vary depending upon a number of factors, including the nature and quality of the oil being deodorized and the operating parameters of the deodorizer. Generally, though, the desirable components in the vapor stream may include triglycerides, diglycerides, tocopherols, sterols, sterol esters, and tocotrienols. The vapor stream may also include droplets of undeodorized or partially deodorized vegetable oil entrained therein. The volume of these droplets in the vapor stream can be reduced by a deodorizer demister 34 adjacent the outlet of the deodorizer 20, as explained above.

The vapor stream may be cooled in the recovery condenser 40 from an initial elevated temperature to a lower intermediate temperature. The initial temperature may be (but need not be) substantially the same as the temperature of the vapor stream exiting the deodorizer and may vary with the temperature of the oil in the deodorizer chamber 22. The initial elevated temperature may be lower than the temperature at which the vapor stream exits the deodorizer due to cooling in the vapor conduit 30, though. In one embodiment, cooling begins in the vapor conduit 30, such as by positioning a recovered fluid spray head 52 in the conduit 30. As noted above, the vapor stream passing through the recovery condenser 40 may be cooled to a lower intermediate temperature before it exits the recovery condenser. This intermediate temperature should be selected to optimize recovery of the desirable components in the vapor stream while reducing the condensation of impurities in the vapor stream into the recovered oil. This lower intermediate temperature will typically be determined on a case-by-case basis for a given type of oil and range of oil compositions, but it generally may be higher if the initial elevated temperature is higher.

In one embodiment, the intermediate temperature is on the order of 50-90%, desirably about 60-80% and, in certain embodiments, 70-80%, of the initial temperature (both stated in degrees Celsius). In another embodiment, the intermediate temperature is about 0-90° C. lower than the initial temperature, with a temperature differential of about 0-40° C. (desirably 10-40° C.) being useful in many deodorizers and a temperature differential of about 30-90° C. (e.g., 30-60° C. or 40-90° C.) being useful in many physical refining processes. In one specific embodiment suitable for processing palm oil, the vapor stream is cooled in the recovery condenser to a temperature of no less than 170° C., e.g., 170-240° C., desirably 175-185° C., e.g., 180° C., before being delivered to the byproduct condenser 70 via the byproduct vapor conduit 68.

The composition of the recovered fluid condensed in the recovery condenser 40 will vary depending on the composition of the vapor stream delivered to the recovery condenser 40. In one embodiment, though, the recovered fluid includes a substantial fraction of the desired components in the vapor stream. As noted above, these desired components can include glycerides, tocopherols, sterols, and sterol esters. In one useful embodiment of the invention, a substantial fraction of the recovered fluid comprises such desirable components and only a relatively minor fraction of the recovered fluid comprises undesirable impurities from the vapor stream.

The byproduct condenser 70 may further cool the byproduct vapor from the intermediate temperature to a lower final condensing temperature. Again, this final condensing temperature may be varied as necessary to accommodate differences in operating pressures, oil composition, and environmental requirements of the vapor delivered to the vacuum system 90. For some oils, cooling the byproduct vapor to too low of a temperature can cause some of the byproducts to unacceptably solidify. Hence, the byproduct vapor from physical refining of palm oil may be cooled in the byproduct condenser 70 to a temperature of about 60-80° C. before it is delivered to the vacuum system 90, while the byproduct vapor from most soft seed oils can be cooled to lower temperatures, e.g., 30-50° C.

Certain aspects of the present invention are exemplified in the following examples. These examples are merely illustrative, however, and are not to be construed as limiting the invention in spirit or scope to the specific procedures or compositions described therein.

EXAMPLE 1

A bleached, unrefined palm oil was delivered to a deodorizer analogous to the deodorizer 20 schematically illustrated in FIG. 2. The oil in each of the deodorizer chambers was maintained at a temperature of about 270° C. and the pressure in the chambers was about 2-3 mm Hg. The vapor stream was cooled in the recovery condenser 40 to a temperature of about 180° C. The recovered fluid from the recovery condenser had a free fatty acid content of about 40 wt. %, with the balance believed to be primarily glycerides and other desirable components of the raw vegetable oil. This recovered fluid was then returned to the flow of oil entering the bleaching subsystem. The byproduct vapor from this process was passed into the byproduct condenser and cooled further to about 60-80° C. The resultant byproduct condensate was found to contain about 93-95 wt. % free fatty acids.

In conventional operation wherein a standard deodorizer is operated under the same conditions and all of the vapor stream is passed to a standard Tirtiaux scrubber, the expected free fatty acid content of the distillate collected in the scrubber was found to be about 85-88 wt. %, substantially less than the 93-95 wt. % found in the byproduct condensate noted above. It is believed that most, if not all, of the increase in the free fatty acid content achieved in accordance with the invention can be attributed to the presence of desirable components of the vegetable oil in the scrubber distillate in the conventional process. Typical bleached palm oil will have a free fatty acid content of about 4 wt. %. By rough approximation, this represents a reduced loss of about 0.25% [4*(1/0.88–1/0.93)] to about 0.50% [4*(1/0.85–1/0.95)] of the amount of processed oil. Improving yields by one quarter to one half of a percent represents a very substantial commercial advantage in the highly competitive vegetable oil market.

EXAMPLE 2

Bleached, unrefined coconut oil was physically refined in a system analogous to that shown in FIG. 3. All of the trays 222 in the deodorizer were maintained at about 240-245° C. and about 2-3 mm Hg. The first recovered fluid collected in the collector 243 had a free fatty acid content in excess of 80 wt. The second recovered fluid (pool 244*b*) had a free fatty acid content of about 30 wt. % and this second recovered fluid was returned to the oil supplied to the bleaching subsystem.

For conventional physical refining of coconut oil using a standard deodorizer and a standard scrubber, the free fatty acid content of the scrubber distillate will vary significantly depending on the deodorizer conditions. For refined oils having a free fatty acid content of about 0.06 wt. %, the free fatty acid content of the standard scrubber distillate would be expected to be about 60-65 wt. %. For a higher quality refined oil with a free fatty acid content of about 0.02 wt. %, the free fatty acid content of the scrubber distillate can drop to 55 wt. % or lower. Again, a significant proportion (if not substantially all) of the drop in free fatty acid content of this scrubber distillate is believed to represent desirable components of the oil. As a consequence, the cost difference between a medium quality oil (0.06 wt. % free fatty acids) and a high quality oil (0.02 wt. % free fatty acids) using conventional processing systems is quite substantial.

The process of the embodiment of the invention outlined above yielded free fatty acid contents in the second recovered fluid much higher than the free fatty acid content of conventional scrubber distillate (over 80 wt. % versus 60-65 wt. %). This can represent a significant commercial advantage when producing the same quality oil in both processes.

Alternatively, the coconut oil can be refined more heavily to drive off more of the free fatty acids, polycyclic aromatic hydrocarbon (PAH) constituents, and other undesirable components. This will produce a higher quality refined oil without significantly dropping yields because much of the additional desirable components driven off with the additional free fatty acids can be recovered and returned to the oil supplied to the deodorizer 220. PAH is often removed, in part, by treating the oil with activated carbon; by refining the oil more heavily, the activated carbon requirements can be reduced without adversely affecting the quality of the final product. Hence, refining more heavily can also deliver a significant commercial advantage over conventional processes.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A glyceride-rich, impurity poor first condensate prepared by a process comprising:
    driving off a first volatiles stream from a partially processed oil, the first volatiles stream comprising a portion of the glycerides and at least a portion of the volatilizable impurity fraction, leaving a processed oil;
    introducing the first volatiles stream into a first condensing chamber; and
    condensing from the first volatiles stream a glyceride-rich, impurity-poor first condensate, leaving a glyceride-poor, impurity-rich reduced secondary volatiles stream, wherein the glyceride-rich, impurity-poor first condensate has a higher content of tocopherol compared to the glyceride-poor, impurity-rich secondary volatiles stream.

2. The glyceride-rich, impurity poor first condensate of claim 1 wherein the first condensate contains a minor fraction of the volatilizable impurities in the first volatiles stream.

3. The glyceride-rich, impurity poor first condensate of claim 1 wherein the first condensing chamber is maintained at a pressure of no greater than 10 mm Hg.

4. The glyceride-rich, impurity poor first condensate of claim 1 wherein the first condensing chamber is maintained at a pressure of no greater than 5 mm Hg.

5. The glyceride-rich, impurity poor first condensate of claim 1 wherein the first volatiles stream is driven off by passing steam through the partially processed oil, the first volatiles stream further comprising steam.

6. The glyceride-rich, impurity poor first condensate of claim 1 wherein the partially-processed oil includes tocopherols, the first volatiles stream further comprising a portion of the tocopherols, a majority of the tocopherols in the first volatiles stream being condensed in the first condensate.

7. The glyceride-rich, impurity poor first condensate of claim 1 wherein the first condensate is sprayed in the first volatiles stream.

8. A glyceride-rich first condensate prepared by a process comprising:
bleaching a vegetable oil to yield a bleached vegetable oil comprising glycerides and a volatilizable impurity fraction;
deodorizing the bleached vegetable oil to yield a deodorized vegetable oil and a first volatiles stream, the first volatiles stream comprising a portion of the glycerides and a majority of the volatilizable impurity fraction; and
partially condensing the first volatiles stream to yield a glyceride-rich first condensate and a glyceride-poor second volatiles stream, the second volatiles stream comprising a majority of the volatilizable impurity fraction, wherein the glyceride-rich first condensate has a higher content of tocopherol compared to the glyceride-poor secondary volatiles stream.

9. The glyceride-rich first condensate of claim 8 further comprising refining the vegetable oil prior to bleaching.

10. The glyceride-rich first condensate of claim 8 further comprising bleaching the first condensate with the vegetable oil to yield the bleached vegetable oil.

11. The glyceride-rich first condensate of claim 8 further comprising condensing the second volatiles stream to yield a byproduct liquid.

12. The glyceride-rich first condensate of claim 8 wherein the first condensate contains a minor fraction of the volatilizable impurities in the first volatiles stream.

13. The glyceride-rich first condensate of claim 8 wherein the first volatiles stream is partially condensed by cooling the first volatiles stream from an initial elevated temperature to a lower intermediate temperature.

14. The glyceride-rich first condensate of claim 13 wherein the intermediate temperature is between 170° C. and 240° C.

15. The glyceride-rich first condensate of claim 8 wherein the first volatiles stream is condensed in a first condenser maintained at a pressure of no greater than 10 mm Hg.

16. The glyceride-rich first condensate of claim 8 wherein the first volatiles stream is condensed in a first condenser maintained at a pressure of no greater than 5 mm Hg.

17. The glyceride-rich first condensate of claim 8 wherein the first volatiles stream is condensed in a first condenser and the second volatiles stream is condensed in a second condenser.

18. The glyceride-rich first condensate of claim 17 wherein the first condenser and the second condenser are each maintained at a pressure of less than 5 mm Hg.

19. The glyceride-rich first condensate of claim 8 wherein the first condensate is sprayed in the first volatiles stream.

20. A recovered fluid produced by the process comprising:
introducing a vegetable oil comprising glycerides into a vessel maintained at a pressure of no greater than 10 mm Hg and contacting the vegetable oil with steam in the vessel to volatilize a substantial fraction of the impurities and a minor fraction of the glycerides into a volatiles stream, leaving a processed vegetable oil;
passing the volatiles stream into a recovery condenser maintained at a pressure of no greater than 10 mm Hg and partially cooling the volatiles stream to preferentially condense a substantial fraction of the glycerides and tocopherol into the recovered fluid, leaving a byproduct stream comprising a substantial fraction of the impurities in the volatiles stream, the volatiles stream being contacted with a portion of the recovered fluid to cool the volatiles stream;
passing the byproduct stream into a byproduct condenser maintained at a pressure of less than 10 mm Hg and further cooling the byproduct stream to condense a majority of the remaining impurities into a byproduct fluid.

21. The recovered fluid of claim 20 wherein the volatiles stream is cooled in the recovery condenser from an initial elevated temperature to a lower intermediate temperature before being passed into the byproduct condenser.

22. The recovered fluid of claim 21 wherein the intermediate temperature is between 180° C. and 230° C.

23. The recovered fluid of claim 20 wherein the process is made substantially continuous by continuously providing the vegetable oil and the mixing at least a portion of the recovered fluid with the vegetable oil.

24. A glyceride-rich, impurity-poor recovered oil produced by a process comprising:
driving off a first volatiles stream from a partially processed oil in a first deodorizing segment, the first volatiles stream comprising a portion of the glycerides and a first portion of a volatilizable impurity fraction;
cooling the first volatiles stream to condense a first recovered fluid;
driving off a second volatiles stream from the partially processed oil in a second deodorizing segment, the second volatiles stream comprising a portion of the glycerides and a second portion of the volatilizable impurity fraction, the first and second portions together comprising a substantial fraction of the volatilizable impurity fraction; and
cooling the second volatiles stream to condense the glyceride-rich, impurity-poor recovered oil and leaving a glyceride-poor, impurity-rich byproduct stream, wherein the glyceride-rich, impurity-poor recovered oil has a higher content of tocopherol compared to the glyceride-poor, impurity-rich byproduct stream.

25. The glyceride-rich, impurity-poor recovered oil of claim 24 further comprising cooling the first recovered fluid prior to contacting the first volatiles stream.

26. The glyceride-rich, impurity-poor recovered oil of claim 24 wherein the first volatiles stream is cooled by contacting the first volatiles stream with a recirculating flow of the first recovered fluid and the second volatiles stream is cooled by contacting the second volatiles stream with a recirculating flow of the second recovered fluid.

27. The glyceride-rich, impurity-poor recovered oil of claim 24 further comprising passing the byproduct volatiles stream into a second condensing chamber and condensing a glyceride-poor, impurity-rich byproduct condensate from the byproduct volatiles stream.

28. The glyceride-rich, impurity-poor recovered oil of claim 24 wherein the first recovered fluid is collected in a first recovery vessel and the recovered oil is collected in a separate, second recovery vessel, the first recovered fluid having a higher percentage of free fatty acids than the second recovered fluid.

29. The glyceride-rich, impurity-poor recovered oil of claim 24 wherein the process is made substantially continuous by continuously providing the partially processed oil and the mixing at least a portion of the glyceride-rich, impurity-poor recovered oil with the partially processed oil.

* * * * *

UNITED STATES PATENT AND TRADEMARK OFFICE
CERTIFICATE OF CORRECTION

| | |
|---|---|
| PATENT NO. | : 8,227,631 B2 |
| APPLICATION NO. | : 12/556463 |
| DATED | : July 24, 2012 |
| INVENTOR(S) | : Marco Kruidenberg |

It is certified that error appears in the above-identified patent and that said Letters Patent is hereby corrected as shown below:

In column 10, line 26, delete "may," and insert -- may --, therefor.

Signed and Sealed this
Twenty-seventh Day of November, 2012

David J. Kappos
*Director of the United States Patent and Trademark Office*